March 5, 1929.  A. APPLEGATE  1,704,355
FLUID DISPENSING DEVICE
Filed July 2, 1926
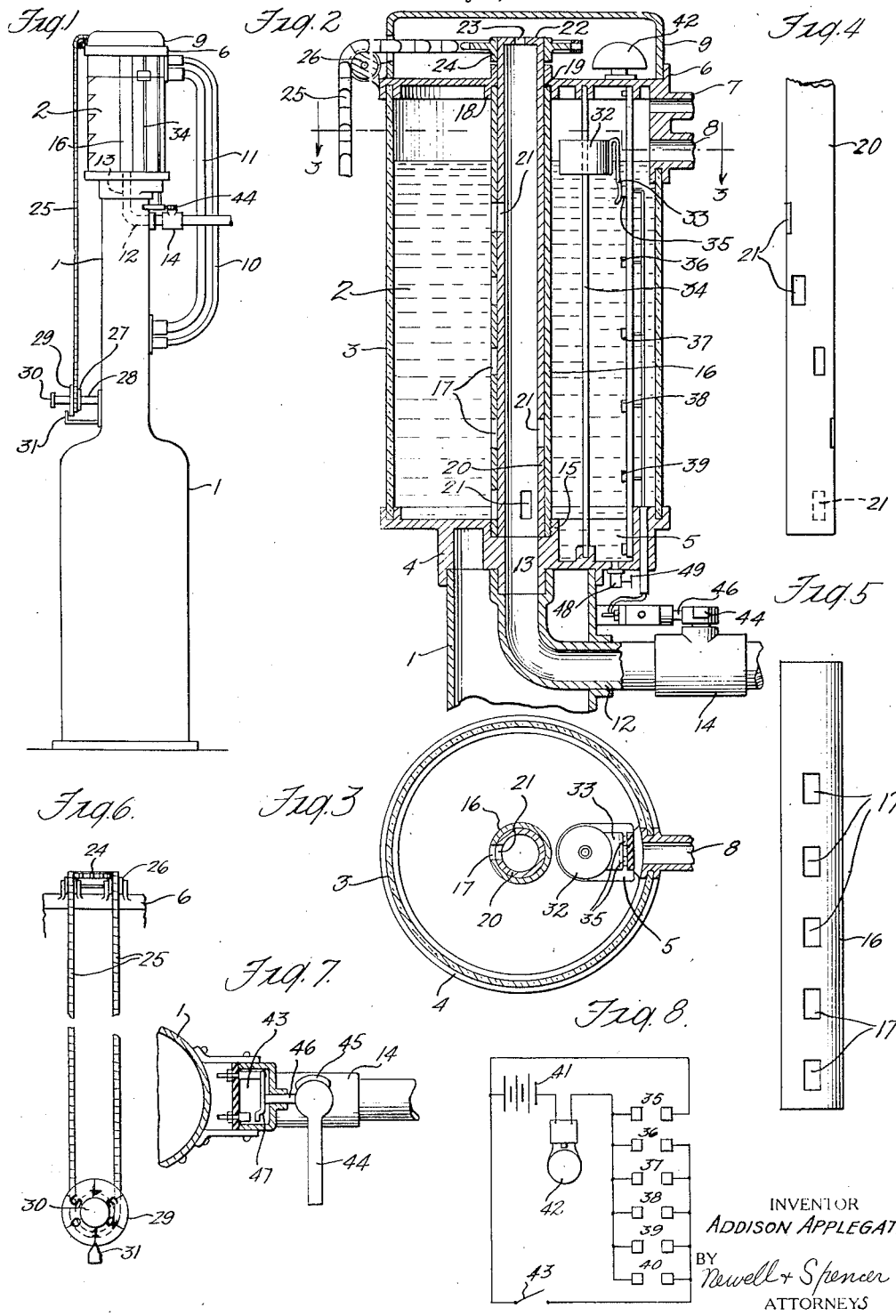
INVENTOR
ADDISON APPLEGATE
BY
Newell & Spencer
ATTORNEYS Patented Mar. 5, 1929.

1,704,355

UNITED STATES PATENT OFFICE.

ADDISON APPLEGATE, OF LIBERTY, NEW YORK.

FLUID-DISPENSING DEVICE.

Application filed July 2, 1926. Serial No. 120,032.

This invention relates to devices for the dispensing of measured quantities of fluid and more particularly to dispensing devices for gasoline.

The simple and rapid dispensing of accurately measured quantities of fluid has achieved great importance in connection with the dispensing of gasoline and other motor fuels to automobiles. The present invention is particularly applicable to such devices but it should be understood that the principles of the invention are in no sense limited to the dispensing of these types of liquids but are generally applicable to the dispensing of any liquid in measured quantities.

The ordinary gasoline pump which is in use at the present time possesses a number of disadvantages. In the first place the accuracy of the pump depends on the tight mechanical fit of its component parts and when the pump wears with the resulting leakage, short measure is frequently given. This may be due to simple wearing or may be the result of tampering with the pump and it is practically impossible for the consumer to detect such short measure. The pumps also operate from underground tanks and frequently the gasoline level in the tanks, which in turn determines the pump suction, may result in inaccuracies when the gasoline in the tank begins to get low.

The so-called "visible" gasoline pump has been designed to overcome some of these objections and it does in fact constitute a distinct forward step. In this type of pump gasoline is pumped up into a glass tank carrying graduations, whence the gasoline is dispensed through the customary hose from this tank. In the usual design of pump where gasoline enters the bottom of the tank through a pipe with a ball check valve a leaky valve will result in short measure, as a portion of the gasoline will run back into the pump. This is also a temptation to the dishonest dealer, as it is very easy to tamper with such check valves and even small quantities of foreign matter introduced into the valve will result in an imperfect seating of the ball check and consequent leakage. The visible tank is also open to the objection that the quantity of gasoline in the tank must be judged by the level which is read from graduations. This is an inaccurate method, particularly as the graduations are not at the level of the eye but are usually considerably above, and inaccurate measure may readily occur, particularly where quantities of gasoline are sold which are less than the full capacity of the tank. This source of error is just as likely to result in overmeasure as in short measure.

Visible tanks are open to the further objection that the customer cannot check up the amount of gasoline delivered to him unless he continuously watches the tank. Thus it is perfectly possible for the dealer to pump a quantity of gasoline into the tank less than its capacity or to shut off the out-flow before the tank is completely emptied. It is common knowledge that many automobile owners do not watch the tank when receiving gasoline, as they do not desire to get out of their machine, particularly in bad weather.

It is the object of the present invention to provide a tank which can be calibrated to give accurate measure at all times, which is practically impossible to tamper with and provides a check for the buyer whether or not he looks at the tank. Other and further features and advantages of the invention will be apparent from the more detailed description to follow.

According to the present invention a measuring tank, either visible or semi-visible, is attached to a gasoline pump and gasoline is introduced into the top, an overflow pipe being preferably provided to secure an accurate upper level. It is thus impossible by any tampering with overflow valves or check valves to bring about a leakage. The tank of the present invention is also provided with audible or visible signals which apprise the owner of the number of gallons actually entering his fuel tank. The invention also includes in its preferred embodiments, a simple and effective means for dispensing intermediate amounts of gasoline, in the ordinary case odd gallons, which is rugged and as nearly tamper-proof as possible. It is an added advantage of the present invention that tanks can be attached to ordinary gasoline pumps without radical re-building.

In the ordinary size tank carrying five gallons, it is necessary to apprise the customer of the fact that the tank is pumped full of gasoline and secondly, to assure him that the correct number of gallons flows into his tank and that the flow is not shut off before all of the gasoline has been permitted to escape. In the preferred embodiment of the present invention this is effected by means of a single stroke bell which is actuated either mechanically or electrically on the level of the gasoline reaching the highest point in the tank and which is also actuated to give a single stroke as each gallon flows out. The bell or other signal is preferably associated with an accurate gallon measuring device and I have found that a pair of concentric tubes with suitably arranged slots at different levels results in an accurate measure which is simple, rugged and practically impossible to tamper with.

The invention will be described in greater detail in connection with the drawings, in which Figure 1 is an elevation of the pump embodying the present invention;

Figure 2 is an enlarged cross section through the dispensing tank;

Figure 3 is a horizontal section along the line 3—3 of Figure 2;

Figures 4 and 5 are details of the inner and outer measuring tubes;

Figure 6 is a detail of the indicator and chain connections for the measuring tubes;

Figure 7 is a detail of the dispensing valve and signal switch; and

Figure 8 is a schematic diagram of the electric connections for the bell.

The figures in the drawing are diagrammatic and the structural features of individual tanks may be varied to suit the conditions of particular installations. Thus, for example, in Figure 1, external tubes are shown for introducing gasoline into the tank and for overflow. This construction is more simple to illustrate but it should be understood that in actual installations these pipes may be arranged in any suitable manner and may, for example, pass up through the liquid in the tank. Similarly other structural features of the device may be varied to meet particular conditions, as will be clear to those skilled in the art.

In Figures 1, 2 and 3 a gasoline pump casing is shown at 1 surmounted by a visible tank 2 consisting in a glass cylinder 3, a lower casting 4 which is attached to the casing 1, and is provided with the well 5, a top casting 6 carrying gasoline introduction passage 7 and overflow passage 8, and a cover 9. Gasoline introduction pipe 10 connects the passage 7 to the main gasoline line in the pump and a similar pipe 11 of somewhat larger dimensions provides for an overflow from the overflow passage 8 back into the main storage tank (not shown).

The dispensing pipe 12 connects with the passage 13 in the lower casting 4 and passes out through the wall of the pump 1. At the end of this pipe is provided the dispensing valve 14 to which is attached the usual flexible hose (not shown). The upper portion of the passageway 13 is provided with an internally threaded flange 15 into which is screwed the tube 16 provided with the slots 17 (see Figure 5). The upper end of this tube fits tightly into the circular recess of the top casting 6 formed by the flange 18 and shoulder 19.

The annular recess in the casting 4 formed by the flange 15 and the passageway 13 is approximately twice the width of the tube or sleeve 16 and a second sleeve 20 provided with spiral slots 21 (see Figure 4) fits inside the sleeve 16 and abuts against the casting 4. The upper end of the sleeve 20 extends above the casting 6 and has a closed end 22 provided with a small vent hole 23. A sprocket 24 is rigidly mounted on the head of the sleeve 20 and serves to turn the latter. A chain 25 passing over the pulleys 26 connects the sprocket 24 to a second sprocket 27 rotatably mounted on the stud 28 and provided with an indicator dial 29 and hand wheel 30. An indicator pointer 31 extends out from the shell 1 in front of the dial.

It will be seen that by rotating the sprocket 27 the sleeve 20 is correspondingly rotated and the slots 21 can be successively brought into register with the slots 17 on the stationary sleeve 16. The levels of these slots are so adjusted as to divide the contents of the tank into gallons. Five slots are shown on each sleeve, whereas six position are shown on the indicator and the spiral on the sleeve 20 does not extend around the full circumference of the sleeve as the slot widths are slightly under one-sixth of the circumference. When the indicator is turned to zero therefore, no slot on the sleeve 20 will register with a slot on the sleeve 16 and accordingly, no gasoline is permitted to flow through the passageway 13. This is in effect a shut-off valve which supplements the ordinary shut-off valve 14 in the dispensing line.

In order to apprise the consumer of the gasoline level in the tank 2 there is provided a float 32, having a contact arm 33 and sliding on a rod 34. The contact arm serves to complete the contact between the signal contacts 35, 36, 37, 38, 39 and 40 as the float rises and falls with the level of the gasoline. It will be noted that the contact arm 33 is bent down so that contact is effected below the surface of the gasoline. This effectively prevents any danger of fire which might be present if the contact were made above the gasoline level, since even if arcing takes place on making or breaking the contacts this will not result in setting fire to the gasoline, owing to the absence of air.

The electrical connections to the contacts include a battery 41, a single stroke bell 42 and a switch 43. This latter switch is actuated by the dispensing valve arm 44 which carries a cam 45 engaging a rod 46 and forces the switch arm 47 into contact when the lever 44 is turned in order to permit gasoline to flow out through the hose.

In operation the valve 14 is closed, which opens the switch 43, and gasoline is then pumped in through the pipe 7. As the level rises in the tank the float rises also successively making contact with the contacts 40, 39, 38, 37, 36 and 35. Since, however, the switch 43 is open the first five pairs of contacts will not actuate the bell. When the tank is full, however, the level being determined by the overflow pipe 8, the float closes the contacts 35 which are not connected through the switch 43 and accordingly the bell 42 sounds a single stroke which apprises both the vender and the consumer that the tank is full. Thereupon the vender ceases to pump and adjusts the indicator dial 29 to the desired number of gallons. Assuming that the consumer desires one gallon, the indicator is turned to 1 (Figure 6) and the inner sleeve 20 is rotated so that the top slot 21 registers with the top slot 17 which position is shown in Figure 2. The valve 44 is then opened, closing the switch 43 and gasoline flows out through the passageway 13, pipe 12 and valve 14. The level of gasoline drops until it reaches the lower edge of the slots 21 and 17, when gasoline ceases to flow. The float 32 also drops and just before the level reaches the lowest portion of the slots the arm 33 makes contact with the contacts 36 and a single stroke of the bell notifies the consumer that one gallon has been taken from the tank.

If a larger number of gallons is desired, say five, the same procedure is followed, the bell indicating when the tank is full but not indicating the intermediate levels as the tank is filled with the valve 14 closed. Then the indicator 29 is set to 5, the lowest slot 21 registers with the lowest slot 17, and when the valve 14 is opened all the gasoline in the tank can flow out. As the first gallon flows out the float falls and the arm 33 makes contact with the contacts 36, producing a single stroke of the bell, and as the remaining gallons flow out the bell gives one stroke for each gallon until the five gallons flow out, when the level drops below the slot and the flow of gasoline ceases.

It will be noted that a well 5 is provided in the casting 4 so that the float and arm can drop to the level of the lowest slot and yet make contact under the gasoline level. This well performs an additional function in that it serves to collect any sediment which may be deposited, and this sediment can be drained off through the pipe 48 provided with the valve 49.

It will thus be seen that the present invention provides for an accurate measure of gasoline which is not dependent upon check valves using, as it does, the large slotted sleeves which are rugged, simple and practically untamperable after once being set and calibrated. The desired number of gallons can be accurately set by the convenient indicator and it is not necessary to watch the gasoline level in the tank when an intermediate number of gallons are required, as is necessary in the ordinary visible tank. Thus, when one attendant operates a number of pumps he can set the tank to deliver any desired number of gallons within its capacity and proceed to another pump without any danger of too much gasoline flowing out of the first tank. An even more important advantage of the invention consists in the fact that it is almost impossible to give short measure to the consumer even though he may not watch the tank, as if the tank is not filled full in the first place, the bell will not ring and the consumer will at once know that the tank has not been completely filled. It is also impossible for the vender to shut off the flow of gasoline before the tank is completely drained or before a certain quantity of gasoline has been dispensed since the consumer can readily check up the number of gallons flowing out by the successive strokes of the bell.

The present invention not only constitutes a simple and accurate dispensing device which is substantially impossible to tamper with after it has once been set by an inspector, but it has a very distinct advertising feature in that the consumer is continuously and audibly assured of the right measure. Deliberate short measure in pumps is probably not as frequent as is popularly supposed, but the consuming public is apt to be suspicious and prefers to obtain its gasoline from pumps which make short measure impossible or which the consumer thinks assure him of correct measure. For this reason visible gasoline pumps have proved to be very popular although, as has been pointed out above, they do not give consumers any very reliable guarantee that they are receiving correct measure. They do, however, possess a very distinct psychological sales appeal and it is an advantage of the present invention that all of the attractive sales features of the visible gasoline pumps are retained, together with really accurate and continuously reliable measure which cannot be obtained from the ordinary visible gasoline pump.

A further advantage of the present invention consists in the fact that normally the visible tank will not be kept full of gasoline because the average consumer will want to hear the bell ring to assure himself that the tank has really been filled and as the bell, for obvious reasons must be a single stroke bell, a tank which stands full will not give any signal. This necessity for filling the tank just prior to dispensing is a valuable feature of the present invention, since the raised tank is usually freely exposed to the sun or to the warm air of summer and the gasoline consequently become heated and expands, so that five gallons of gasoline standing in the ordinary visible tank provided with an overflow may expand so as to lose a considerable percentage of weight and of course, the gasoline that the consumer really uses is measured by the weight and not by the volume. This unintentional short measure in warm weather is to a great extent obviated by the present invention in which the consumer will ordinarily demand that the tank be filled just prior to dispensing and this is an added advantage of the present invention.

The present invention has been described in detail in connection with a preferred embodiment but it should be understood that it is not restricted to the details therein set forth. Thus, the design of the slotted sleeves may be considerably varied. For example, instead of staggering the slots on the inner sleeve, they may be staggered on the outer sleeve or on both sleeves. Instead of a bell a light signal may be used and the float may operate the bell by a different type of electric contact or even mechanically, although for most purposes electric operation is preferred. The level indication may also be effected without the use of a float by means of the hydrostatic pressure of the gasoline in the tank or by any other suitable means.

The rotation of the measuring sleeves can be very conveniently effected by the chain and sprocket arrangement shown in the drawings, but obviously this same rotation can be effected by other means. For example, when the pump is not of great height a lever attached to the sleeve can project through the top and can be turned to various positions, thus obviating the necessity of the chain and spockets. Other methods of rotating the measuring sleeves may also be utilized.

In the preferred embodiment shown in the drawings a glass enclosed visible tank is used and for many purposes this is preferable. In the first place there is always the psychological advantage that the consumer sees what he is getting and a visible tank also shows the operating mechanism more clearly and satisfies the almost universal human interest in watching mechanisms operate. It will be clear, however, that the measuring of the gasoline and the warning signals are in no sense dependent on the use of a visible tank and for some purposes a metal tank, which is frequently cheaper to construct, may be substituted with advantage. If a visible level check is desired an external gage glass may be used or a glass slot in a metal tank may serve this purpose or any other visible level recording means may be utilized without impairing the operation of the present invention.

The valve operated switch 43 of the preferred embodiment has many advantages, as it is simple, fool-proof and practically automatic, requiring no attention other than the necessary one of opening the valve. For some purposes, however, it may be undesirable to actuate the switch from a valve lever and in such a case the switch may be automatically actuated by the flow of the gasoline through the pipe 12 or by any other suitable means.

What I claim as new is:

In a liquid dispensing device, electrical means for giving signals at different liquid levels including a source of electrical energy, signalling means in circuit therewith, level indicating contacts situated in said device at different levels, liquid level controlled switching means for establishing a circuit through said contacts, the level indicating contacts corresponding to the highest level being in circuit with the cource of electrical energy and the signalling means when bridged by said switching means, a dispensing means controlled switch in circuit with the contacts corresponding to lower levels operating through said switching means to close said circuits only when liquid is dispensed.

Signed at New York, New York, this 1st day of July, 1926.

ADDISON APPLEGATE.